US006941175B2

(12) United States Patent
Amrhein et al.

(10) Patent No.: US 6,941,175 B2
(45) Date of Patent: Sep. 6, 2005

(54) METHOD OF OPERATING AN INDUSTRIAL CONTROLLER

(75) Inventors: Armin Amrhein, Kümmersbruck (DE); Johannes Birzer, Stulin (DE); Thomas Hennefelder, Sugenheim (DE); Martin Kiesel, Poxdorf (DE); Raimund Kram, Erlangen (DE); Regina Schmitt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 807 days.

(21) Appl. No.: 09/938,752

(22) Filed: Aug. 24, 2001

(65) Prior Publication Data

US 2002/0082718 A1 Jun. 27, 2002

(30) Foreign Application Priority Data

Dec. 27, 2000 (DE) ........................................ 100 65 416
Mar. 26, 2001 (DE) ........................................ 101 14 871

(51) Int. Cl.[7] ................................................ G05B 11/01
(52) U.S. Cl. .............................. 700/23; 700/6; 700/18; 700/14; 700/159; 700/169; 700/11; 718/103; 718/107; 718/100
(58) Field of Search ................................ 700/6, 18, 19, 700/20, 23, 14, 159, 169, 11; 709/103, 107, 100; 718/103, 107, 100

(56) References Cited

U.S. PATENT DOCUMENTS 5,012,409 A * 4/1991 Fletcher et al. ............. 718/103
5,193,189 A * 3/1993 Flood et al. ................ 718/103
5,619,409 A * 4/1997 Schultz et al. ................ 700/17
5,636,124 A * 6/1997 Rischar et al. .............. 700/100
6,260,058 B1 * 7/2001 Hoenninger et al. ........ 718/107
6,356,795 B1 * 3/2002 Barthel et al. ................ 700/82
6,594,541 B1 * 7/2003 Wucherer et al. ........... 700/159
6,779,174 B2 * 8/2004 Amrhein et al. ............ 717/131

FOREIGN PATENT DOCUMENTS

| | | |
|---|---|---|
| DE | EP0735445 | 10/1996 |
| DE | 19740550 A1 | 4/1998 |
| DE | 19931933 | 7/1999 |
| EP | 0735445 | 3/1996 |

* cited by examiner

*Primary Examiner*—Ramesh Patel
(74) *Attorney, Agent, or Firm*—Baker Botts L.L.P.

(57) ABSTRACT

Mechanisms for operating an industrial controller (S) equipped with a runtime system (RTS), in particular for production machines, which enable a user to wait in the program flow for any desired condition are provided, the program flow being immediately continued when the condition is satisfied and the program flow being stopped when the condition is not satisfied, until it is established that the condition has been satisfied, the priority of the checking for the condition being increased in comparison with the current task priority while waiting for the condition to be satisfied. When the condition has been satisfied, a defined program sequence is processed with high priority up to an explicit end, the old task priority being resumed after the explicit end of the program sequence.

16 Claims, 6 Drawing Sheets

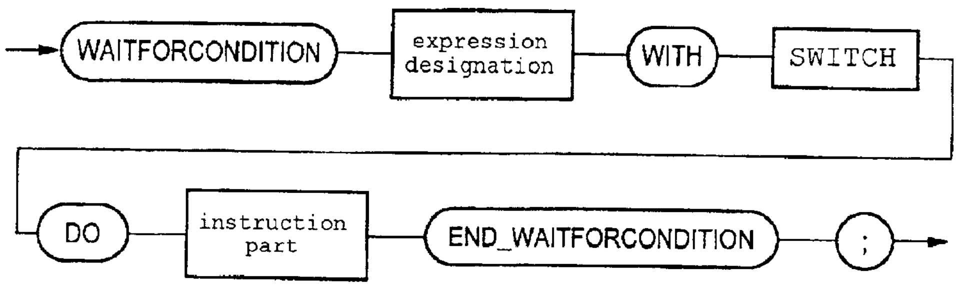

FIG 8

```
IMPLEMENTATION

EXPRESSION myExpression
//Agreement of local variables possible
VAR
   myLoc : WORD
END_VAR
   myLoc :=%IW10 & 16#ff00;
   //This is a condition to be evaluated with
   //WAITFORCONDION (return value of the function). If
   //FALSE, the relevant task is suspended until the
   //TRUE condition is obtained.
   myExpression :=myloc <> 16#0100;
END_EXPRESSION


PROGRAM myProgram
   ...
   //Calling of the command with name of the expression
   WAITFORCONDITION myExpression WITH TRUE DO
   //here at least one instruction is executed with
   //high priority
   END_WAITFORCONDITION;
  END_PROGRAM
END_IMPLEMENTATION
```

FIG 9

METHOD OF OPERATING AN INDUSTRIAL CONTROLLER

FIELD OF THE INVENTION

The invention relates to a method of operating an industrial controller, in particular for production machines. The invention also relates to an industrial controller for carrying out the method according to the invention.

This application is related to U.S. patent application Ser. No. 09/938,751, filed Aug. 24, 2001 by the present inventors.

BACKGROUND OF THE INVENTION

It is customary nowadays, both for stored-program control (SPC) and for motion control (MC), to model hierarchical running levels that are different in each case and are assigned software tasks for controlling the respective technical process. These tasks may perform system functions, but may also be user-programmed.

It is known from DE 197 40 550 A1 that process control functionalities of the stored-program controllers "SPC" and motion functionalities of MC controllers can be integrated in a uniform configurable control system.

This SPC/MC integration takes place in the form of interconnecting SPC and MC control modules. However, when the integration is carried out in such a way, an optimum and efficient task structure is not achieved for the entirety of the control tasks. Furthermore, with this type of integration it is mainly the classic MC functionalities, as are relevant in particular for machine tools, that are supported. Requirements for the controller, as they are known from the operation of production machines, are not optimally supported by this type of interconnection of SPC and MC control modules.

It is known from EP 0 735 445 A2 to use a separate waiting command (WAIT) for the operation of a machine tool or a robot. However, the waiting command (WAIT) described here still does not optimally support the control of production machines in particular.

In the application DE 19 93 19 33.2 it is proposed to use the clock of the communication system between the PC system and the peripheral devices for a change between a real-time operating program and a non-real-time operating program. Here, however, it is the task of this clock pickup from the communication system to allow the smoothest possible change to take place between real-time and non-real-time applications in an industrial process. In this configuration, the basic clock is only derived however from the clock of the communication medium and it is only used for the changing of the operating system mode of a PC system.

SUMMARY OF THE INVENTION

The invention therefore has as its object the creation in a simple manner of an industrial controller with optimum distinctive characteristics for different control tasks and different boundary conditions or requirements of the underlying technical process, the controller providing both SPC and MC functionality and consequently also being suitable for the control of production machines.

These optimum distinctive characteristics are achieved in principle on the one hand by a uniform configurable running level model for the control tasks of the industrial controller and on the other hand by mechanisms (e.g., wait for-condition commands) which enable a user to wait for any desired conditions and respond with higher priority in the program flow.

Setting out from this approach, the object stated above is achieved by providing mechanisms which enable a user to wait in the program flow for any desired condition, the program flow being immediately continued when the condition is satisfied and the program flow being stopped when the condition is not satisfied, until it is established that the condition has been satisfied, the priority of the checking for the condition being increased in comparison with the current task priority while waiting for the condition to be satisfied. This mechanism makes it possible to express a unified and closed task definition in a piece of code of a user program without further mechanisms, such as for example event handlers, being required. A user can consequently formulate the waiting for high-priority events in a sequential program sequence on a relatively low priority level of a "motion task" by program constructs in his program flow (user program), without having to change into another program. This on the one hand avoids a management overhead in the controller, which directly enhances the system performance, and on the other hand supports the locality principle from a programming viewpoint, as a result of which, for example, debugging is made easier.

The mechanism described and the associated command are referred to hereafter as the "wait_for_condition".

A first advantageous refinement of the present invention is that, once the condition has been satisfied, the following program sequence is processed with high priority up to an explicit end, the old task priority being resumed after the explicit end of the program sequence. As a result, high deterministics are achieved in the sequence "waiting for external event" and the "action which follows this event", for example corrective movements in the case of printed mark synchronization. A user consequently has the possibility of temporarily switching to a high priority level in his programs and thereby being able to describe deterministic processes easily and elegantly. Application examples are, for example, printed mark synchronization and a rapid start of movement (for example after an edge change).

A further advantageous refinement of the invention is that process signals and/or internal signals of the controller and/or variables from user programs are used for the formulation of the conditions. This makes it possible for the user when describing the conditions to use not only user program variables but also directly system states and process signals in a uniform way.

A further advantageous refinement of the invention is that the conditions contain logical and/or arithmetic and/or any desired functional combinational operations. It is consequently possible for the user to specify complex synchronization relationships within an instruction.

A further advantageous refinement of the invention is that a user program for the operation of the controller contains more than one such wait-for mechanism. As a result, the flexibility and possibilities for the user, in particular with regard to the description of synchronization activities, in the programming of the applications are increased.

A further advantageous refinement of the invention is that, in the operation of the controller, there may be a plurality of user programs which contain these wait-for mechanisms. As a result, the flexibility and possibilities for the user, in particular with regard to the description of synchronization activities in the programming of the applications are increased.

A further advantageous refinement of the invention is that the respective wait-for mechanism is available to a user in a user program as a customary programming-language construct. The "wait_for_condition command", which triggers this mechanism, can consequently be used by a user in the user programs, for example like a while loop, whereby the programming is made very much easier.

A further advantageous refinement of the invention is that the runtime system of the controller contains a running level model which has a plurality of running levels of different types with different priority, the following running levels being provided:

a) a group of levels with synchronously clocked levels, comprising at least one system level and at least one user level, it being possible for the levels of this group of levels to have prioritizing with respect to one another;

b) a user level for system exceptions;

c) a time-controlled user level;

d) an event-controlled user level;

e) a sequential user level;

f) a cyclical user level, user levels of the group of levels a) optionally being able to run synchronously in relation to one of the system levels of the group of levels a).

A major advantage of this stratification is that the communication between the tasks of the process controller (SPC) and those of the motion controller (MC) is minimized. A further advantage is that the programming of the control tasks for the process controller and for the motion controller can take place in a uniform programming language with a uniform creation interface and that the user can flexibly create a running level model tailor-made for his respective requirements.

A further advantageous refinement of the invention is that the basic clock of the running level model is derived from any of an internal timer, an internal clock of a communication medium, an external device or a variable which belongs to the technological process. As a result, the basic clock for the running level model can be derived in a very flexible and very easy manner. The fact that the basic clock for the running level model can also be derived from a variable which belongs to the technological process allows direct feedback from the technological process to the controller to be obtained in a very easy way.

A further advantageous refinement of the invention is that the timecontrolled user level, the event-controlled user level, the sequential running level, the cyclical background level and the user level for system exceptions are optional. As a result, the user can very flexibly create for himself a controller which is very efficient for his actual requirements and which contains the running levels required at the specific time, and consequently does not include any unnecessary overhead.

A further advantageous refinement of the invention is that the synchronous levels are clocked in relation to the basic clock with a step-up and/or step-down ratio and/or in the ratio 1:1. As a result, the levels can in each case be clocked very easily to a multiple of the basic clock or else be clocked in each case to a reciprocal multiple. On the basis of a common starting variable, step-up ratios or else step-down ratios can consequently be achieved very easily for the respective levels.

A further advantageous refinement of the invention is that further prioritizing stratifications are provided within the running levels. As a result, the software structure of the industrial controller can be adapted optimally to the different control tasks or to the requirements of the underlying technical process. Consequently, for example, different causes of faults can be assigned to different levels, with, for example, ascending priority.

A further advantageous refinement of the invention is that user tasks can optionally be run through during system running-up and/or during system running-down. This allows, for example, initialization functions to be started during system running-up or to ensure during system running-down that the axes present in the system assume a defined position.

A further advantageous refinement of the invention is that user programs which, depending on the type of user level, are programmed in a cycle-oriented or sequential manner can be loaded into the user levels. This allows the user to adapt the functionality of the controller very flexibly to the underlying requirements of the technical process in his user programs and also allows him to load the user programs into different user levels, in order in this way to achieve distinctive characteristics of the controller that are effective for his respective applications. A further advantage is that the user can load both cycle-oriented user programs and event-oriented user programs into a uniform running level model or runtime system of an industrial controller. A user can consequently additionally load programs programmed according to different paradigms (cycle-oriented for SPC functionality and event-oriented or sequentially for motion functionality) very flexibly and conformally into the user levels of the running level model.

BRIEF DESCRIPTION OF THE DRAWINGS

An exemplary embodiment of the invention is described below in conjunction with the appended drawings, in which:

FIG. 8 shows the syntactic description of the wait_for_condition command in a syntax diagram;

FIG. 9 shows an example of the formulation of an expression in programming-language notation.

DETAILED DESCRIPTION OF THE INVENTION

Figure 1:
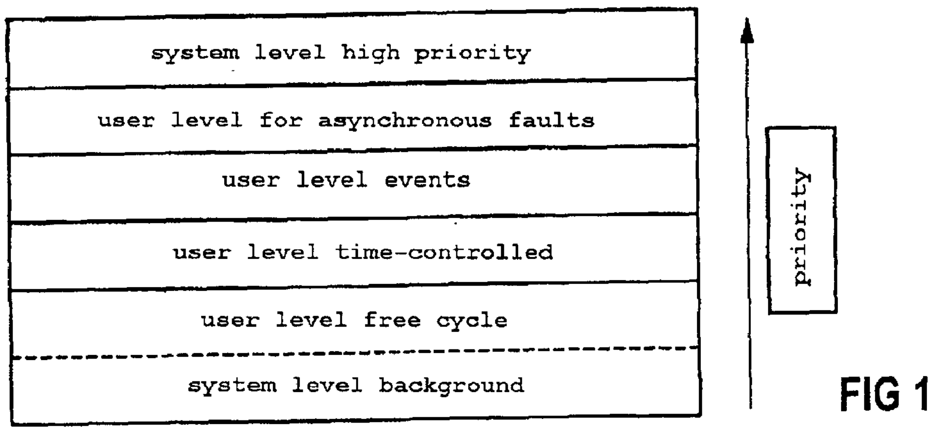
FIG. 1 shows the main running levels of a classic stored-program controller.

In FIG. 1, the main running levels of a classic stored-program controller (SPC), arranged according to their priority, are shown. The increase in priority is symbolized there by the upwardly pointing arrow. In the lowest-priority level, two different tasks are performed, as indicated by the dashed line. Specifically, these are a free cycle, i.e., "user level free cycle" and a background system level, i.e., "system level background". The background system level is assigned, for example, communication tasks. In a following user level, referred to as "user level time-controlled", the parameters for the calling clock of the tasks or of the programs of this level can be parameterized. Monitoring takes place to ascertain whether the processing of a user program of this clocked level has been completed in time before the start event occurs once again. If the clock time elapses without the user program of the assigned level being processed to completion, a corresponding task of a next-but-one, in priority terms, "user level for asynchronous faults" is started. In this "user level for asynchronous faults", the user can program out the handling of fault states.

The "user level time-controlled" is followed by a "user level events". The response to external or internal events takes place within the "user level events". A typical example of such an event is the switching of a binary or digital input, whereby typically an event is triggered. In a "system level high priority" lie the tasks of the operating system which ensure the operating mode of the programmable controller (SPC).

Figure 2:
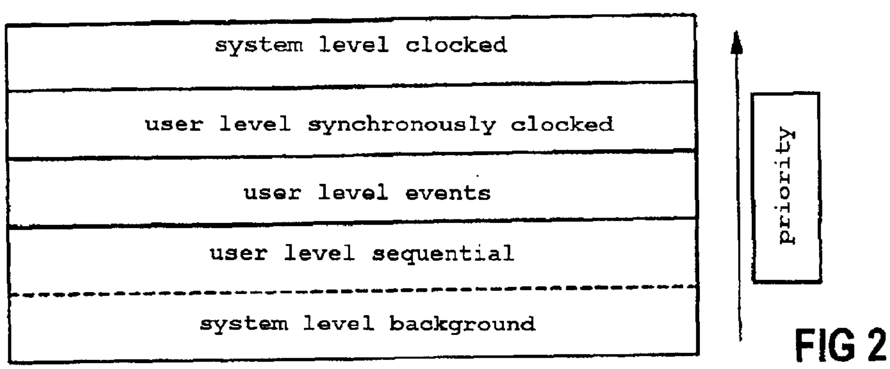
FIG. 2 shows the main running levels of a motion controller.

The representation according to FIG. 2 shows the main running levels of a motion controller (MC). Here, too, the individual levels are arranged hierarchically according to their priority, as symbolized by the upwardly arrow. A "system level background" and a "user level sequential" have an equal priority, that is the lowest priority. This unified nature in terms of tasks is symbolized as in FIG. 1 by a dashed line. The tasks of the "user level sequential" are processed together with the tasks of the "system level background" in the round-robin procedure. Typical tasks of the "system level background" are, for example, those for communication task. In the "user level sequential", the parts of the program programmed by the user run for the actual control task. If, in one of these parts of the program, the controller encounters a movement or positioning command, a "suspend" is set, i.e., the user program is interrupted at this point. In this case, a command is synchronously used. The processing of this movement or positioning command take place in a highest-priority "system level clocked". Each and every position controller or interpolator which is running in the "system level clocked" executes this movement or positioning command. After execution of the command, control returns to the "user level sequential" and the user program interrupted by "suspend" is continued by a "resume" at the same point. The "system level clocked" contains not only the already mentioned position controllers but also the interpolation part of the control.

The "user level events" resumes at the lowest-priority level. Accommodated here are those tasks which respond to external or internal events. Such events may be alarms, for example.

In a following "user level synchronously clocked", synchronously clocked user tasks are performed, for example controller functionalities. These tasks are synchronized in relation to clocked system functions, such as for example the interpolator, position controller or cyclical bus communication.

Figure 3:
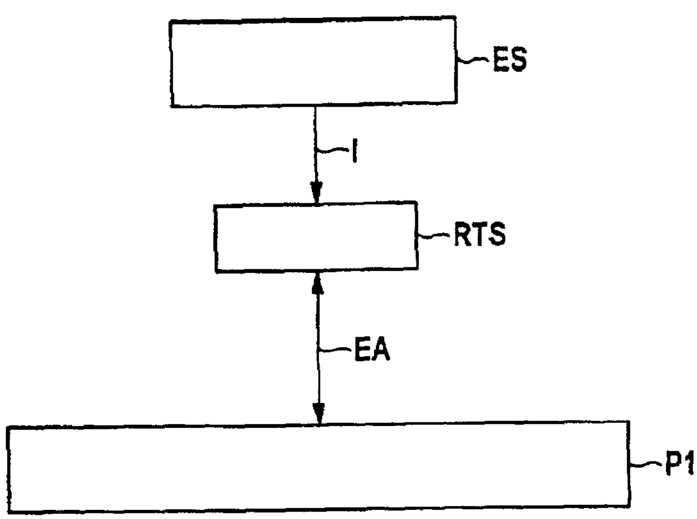
FIG. 3 is a schematic representation of an industrial controller.

In FIG. 3, there is shown, in the form of a block structure diagram, that the control of a technical process P1 is performed by means of the runtime system RTS of an industrial controller. The connection between the runtime system RTS of the controller and the technical process P1 takes place bidirectionally via the inputs/outputs EA. The programming of the controller, and consequently fixing the behavior of the runtime system RTS, takes place in the engineering system ES. The engineering system ES contains tools for configuring, project planning and programming for machines or for controlling technical processes. The programs created in the engineering system are transferred via the information path I into the runtime system RTS of the controller. With respect to its hardware equipment, an engineering system ES usually comprises a computer system with graphics screen (display), input aids (for example, keyboard and mouse), processor, main memory and secondary memory, a device for accepting computer-readable media (for example, floppy disks, CDs) and also connection units for data exchange with other systems (for example, further computer systems, controllers for technical processes) or media (for example, the Internet). A controller usually comprises input and output units, and also a processor and program memory. It is also conceivable for the control of a technical process P1 to be performed by means of a plurality of runtime systems RTS of industrial controllers.

Figure 4:
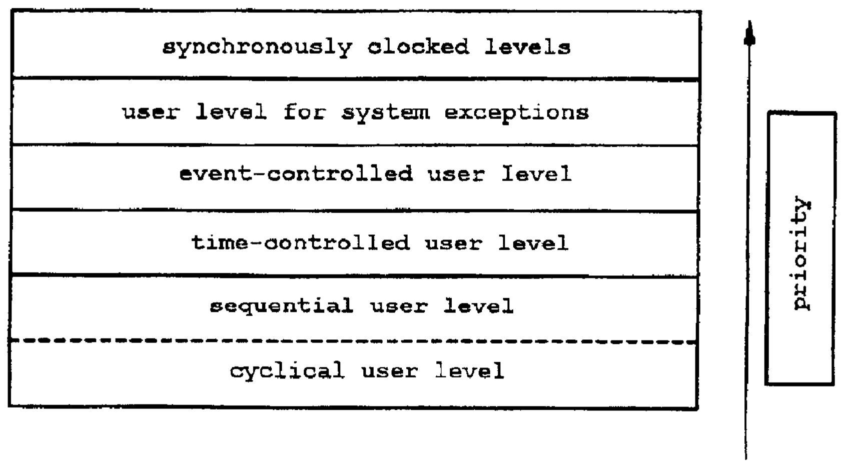
FIG. 4 shows the running level model of the industrial controller according to the invention.

The representation of FIG. 4 shows the running level model of the industrial controller according to the invention. The prioritizing of the levels is indicated by the arrow pointing upwardly in the direction of the highest priority. The lowestpriority levels are the "cyclical user level" and the "sequential user level". These two levels run with the same priority. Therefore, these levels are separated in the representation according to FIG. 4 by a dashed line. The "cyclical user level" includes the "background task", which is cycle-time-monitored. In the "sequential user level", the "motion tasks" are run through. "Motion tasks" are not cycle-time-monitored and serve essentially for describing sequential sequences. "Motion tasks" are processed virtually in parallel. Generally, all the user levels contain one or more tasks. The tasks receive the user programs. The tasks of the "cyclical user level" and of the "sequential user level" are processed in a common round-robin cycle.

The next-following level is the "time-controlled user level". The tasks of this level are activated in a time-controlled manner. The time control can be set in a scale of milliseconds. The "time-controlled user level" is followed by the "event-controlled user level". In this level, after detection of a user interrupt, what are known as "user interrupt tasks" are activated. User interrupt events may be formulated as a logical combination of process events and/or internal states.

The next-higher level is the "user level for system exceptions". In this "user level for system exceptions", monitoring of system interrupts is carried out. The occurrence of system interrupts has the effect of generating what are known as "exceptions", i.e., instances of handling exceptional cases. In the "user level for system exceptions" there are, for example, the following tasks, which are activated when a corresponding system interrupt occurs:

a) "time fault task", which is activated when time monitors respond;

b) "peripheral fault task", which is activated for example in the event of process and diagnosis alarms, but also in the event of station failure or station return;

c) "system fault task", which is activated in the event of general system faults;

d) "program fault task", which is activated in the event of programming faults (for example division by zero);

e) "time fault background task", which is activated when the cycle time monitoring of the background task responds; and f) "technological fault task", which is activated in the event of technological faults.

Figure 5:
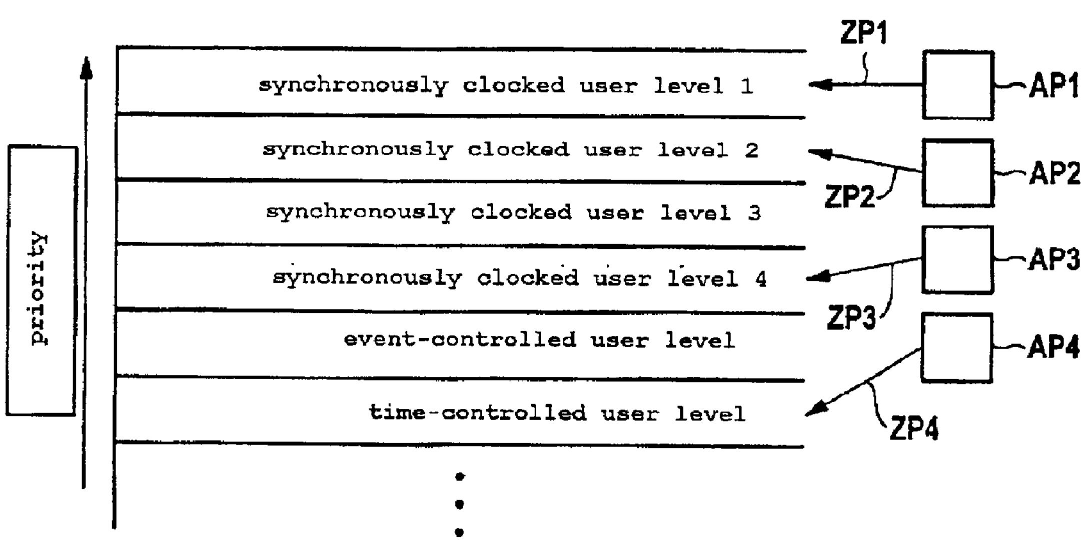
FIG. 5 shows an exemplary embodiment of the loading of user programs into the user levels.

Following next is the group of levels "synchronously clocked levels". This group of levels has the highest priority in the running level model. The individual levels of this group of levels may be further prioritized with respect to one another. The group of levels "synchronously clocked levels" comprises at least one system level and at least one user level. The system levels include the system functions such as, for example, position controller or interpolator. User programs (AP1–AP4; FIG. 5) can be flexibly loaded in addition by a user into the user levels of this group of levels.

Figure 10:
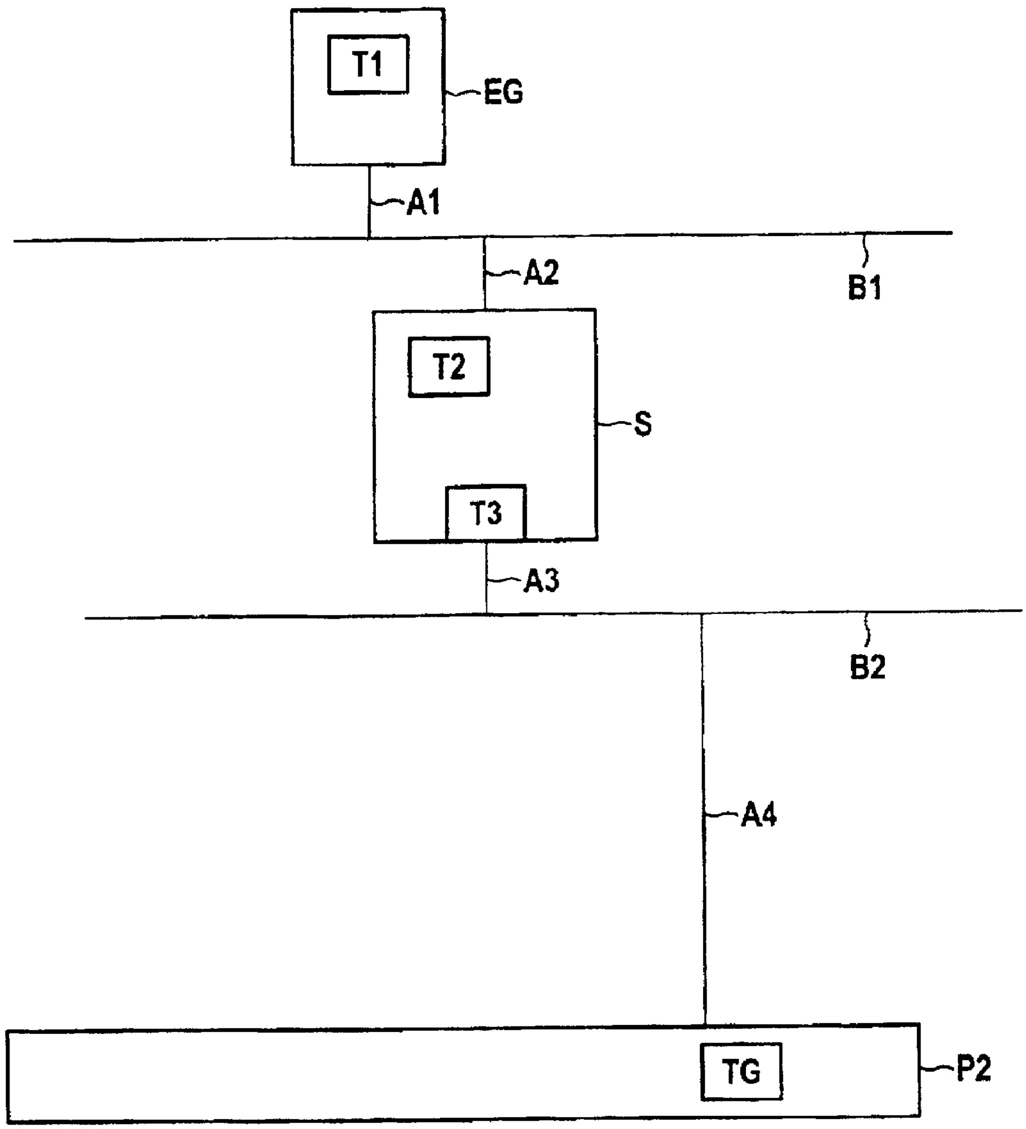
FIG. 10 shows in a schematic representation possibilities for obtaining the basic clock for the industrial controller.

For the clock control of the "synchronously clocked levels" there are a number of different possibilities for clock generation. The basic clock may come, for example, from an internal timer (T1; FIG. 10) or from an internal clock (T3; FIG. 10) of a communication medium (for example Profibus) or else the clock may also be derived from a process event of the technological process. Such a process event may be, for example, the clock rate (TG; FIG. 10) of an operation on a production machine or packaging machine. User levels of the group of levels "synchronously clocked levels" may in this case be clocked on the basis of the basic clock, but they may also run synchronously in relation to one of the system levels of the group of levels "synchronously clocked levels". The user tasks of this user level synchronous to a system level consequently have a synchronous, i.e., deterministic, relationship with a system level which can be flexibly fixed by the user. This has the advantage that deterministic responses to system tasks (system tasks run in the system levels) which the user has programmed in his user tasks, which run in the user levels of the group of levels "synchronously clocked levels", are guaranteed by the system. That is to say, for example, that the system guarantees that this "synchronous user level" is correspondingly activated for example before the interpolator, or else before any other desired system function.

The "time-controlled user level", the "event-controlled user level", the "sequential user level", the "cyclical user level" and the "user level for system exceptions" are optional.

The task of the "cyclical user level" (background task) is cycle-time-monitored. The "motion tasks", on the other hand, are not cycle-time-monitored and serve essentially for describing sequential sequences. That is to say the present running level model supports a user both in the programming of sequential sequences and in event programming. Consequently, synchronous events and asynchronous events can be covered by the programming. The user programs (AP1–AP4; FIG. 5) created by the user can be loaded in addition into the user levels. The user programs AP1 to AP4 are usually created with the aid of a programming environment of the engineering system (ES; FIG. 3).

FIG. 5 illustrates an exemplary embodiment of the additional loading of user programs into the user levels. FIG. 5 shows by way of example distinctive characteristics of user levels of the running level model. As shown by the three bold dots at the lower edge of the drawing, there may also be still further user levels, or else system levels. The prioritizing of the levels is indicated as above by the arrow pointing upwardly in the direction of the highest priority. The user levels are assigned the user programs AP1 to AP4, indicated at the right-hand edge of the figure by small squares. The assignment is shown by assignment arrows ZP1 to ZP4. In the user levels 1 to 4 there are tasks which receive the additionally loaded user programs AP1 to AP4, respectively. These tasks are then run through or processed in accordance with a specific strategy (for example sequentially). They may continue to have the property that they are run-time-monitored.

Figure 6:
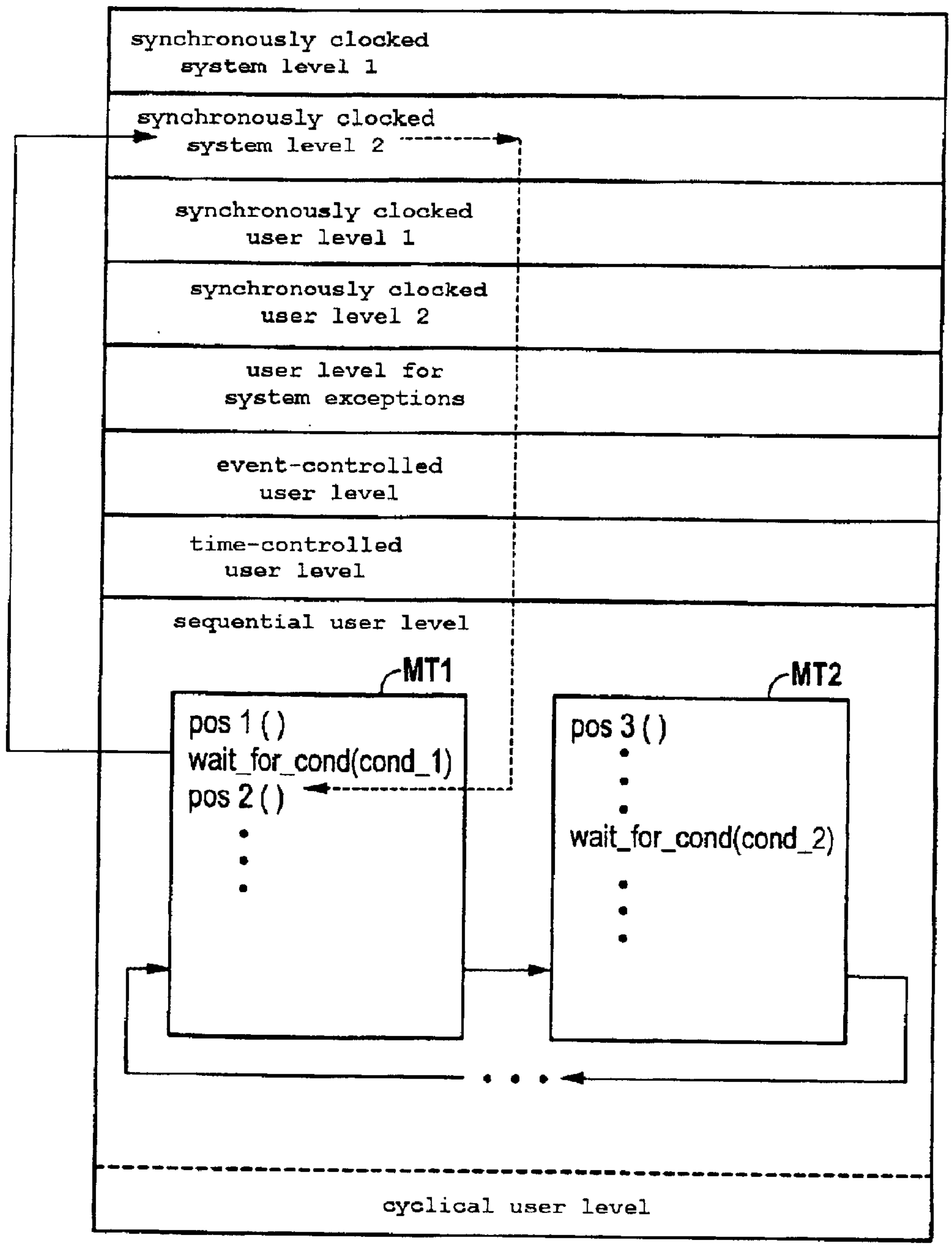
FIG. 6 shows an exemplary embodiment of the use and mechanism of the wait_for_condition command in the running level model of the industrial controller according to the invention.

FIG. 6 shows an exemplary embodiment of the use and mechanism of the wait_for_condition command, in the running level model of the industrial controller according to the invention. The wait_for_condition command (represented in FIG. 6 as wait_for_cond( )) is used by way of example in this representation in the "sequential user level". The wait_for_condition command is used in the "motion tasks" MT1 and MT2 created by the user, which are a component part of the "sequential user level". The "motion tasks" MT1 and MT2 are in a round-robin cycle, represented by the arrow from MT1 to MT2 and by the looping return arrow from MT2 to MT1. The three bold dots in the return arrow indicate that there may be still further "motion tasks" in the round-robin cycle. The "motion task" MT1 contains the wait for condition command "wait_for_cond(cond_1)", the "motion task" MT2 contains the wait_for_condition command "wait_for_cond(cond_2)". The bold dots included in each case within MT1 and MT2 indicate that, in addition to the two wait_for_condition commands and the three positioning commands pos1( ) to pos3( ), still further commands may be contained in the "motion tasks".

Altogether, the running level model, represented by way of example in FIG. 6, of a runtime system for an industrial controller comprises the following levels (enumeration from the lowest to the highest priority): "cyclical user level", "sequential user level" (the tasks of these two levels have the same priority, represented by the dashed line between these levels), "time-controlled user level", "event-controlled user level", "user level for system exceptions", "synchronously clocked user level 2", "synchronously clocked user level 1", "synchronously clocked system level 2" and, as the highest-priority level, a "synchronously clocked system level 1".

The operating mode of the wait_for_condition command is shown by way of example by "wait_for_cond(cond_1)" from the "motion task" MT1. If the "motion task" MT1 is next in turn in the round-robin cycle, the commands of the "motion task" MT1 are serviced until the time slice has elapsed, or an interruption occurs. If this is the case, the "motion task" MT2 is serviced as the next task in the cycle, etc. If the wait_for_cond(cond_1) command is processed in the "motion task" MT1, the condition cond_1 is checked. If cond_1=true, that is to say is satisfied, the next-following command pos2( ) is immediately executed and, if appropriate, further commands present in MT1 are successively processed, until control is passed to the next task.

If the condition cond_1=false, that is to say is not satisfied, the "motion task" MT1 is immediately interrupted and MT2 is serviced in the round-robin cycle. The condition cond_1 is inserted, however, into the "synchronously clocked system level 2" (indicated by the solid line arrow from the wait_for_cond(cond_1) command to the "synchronously clocked system level 2") and is checked in the clock cycle of this system level to ascertain whether it has been satisfied. If the condition cond_1 is satisfied, the current task is displaced in the round-robin cycle, i.e., it has the time slice withdrawn from it and the motion task MT1 is continued immediately after the wait_for_cond(cond_1) with the positioning command pos2( ). The return from the "synchronously clocked system level 2" to the positioning command pos2( ), i.e., to the "sequential user level", is indicated by the dashed line arrow.

The fact that, when the condition of the wait_for_condition command has not been satisfied, the checking for the condition takes place in a high-priority "synchronously clocked system level" and, when the condition has been satisfied, the interrupted "motion task" is continued immediately, makes it possible for a user to specify extremely time-critical applications by simple language means during the programming of sequences of movements. The performance and deterministics are further enhanced by only inserting and considering currently applicable conditions when checking the conditions in the respective high-priority "synchronously clocked system levels".

The mechanism described here also does not require an explicit event handler. Consequently, the great advantage from the user viewpoint is that the user can now formulate high-priority events in a sequential running program on a relatively low priority level of a "motion task" in his program flow with the aid of program constructs, and does not have to change into another program which he then has to project by means of other mechanisms (for example manually or under interrupt control) onto a synchronous user task. Instead, the user has the possibility in a closed user program of formulating this "waiting for high-priority event" and "high-priority reaction" cycle for this event in a program on a closed basis.

The conditions which are inquired in a wait_for_condition command can be formulated very flexibly and elegantly by the user. For instance, for formulating these conditions, the user can use program variables from a user program or internal variables of the controller, or he can also reference process signals. These variables may then be combined logically, arithmetically or by any desired functions in terms of their content, to formulate a condition from them. In addition to the high-priority inquiries as to whether the condition is satisfied, it is also conceivable that, if the condition is satisfied, a program code belonging to it, i.e., an underlying response, which is user-programmable, is also executed with high priority and the return to the low-priority level only takes place after execution of this program code.

Figure 7:
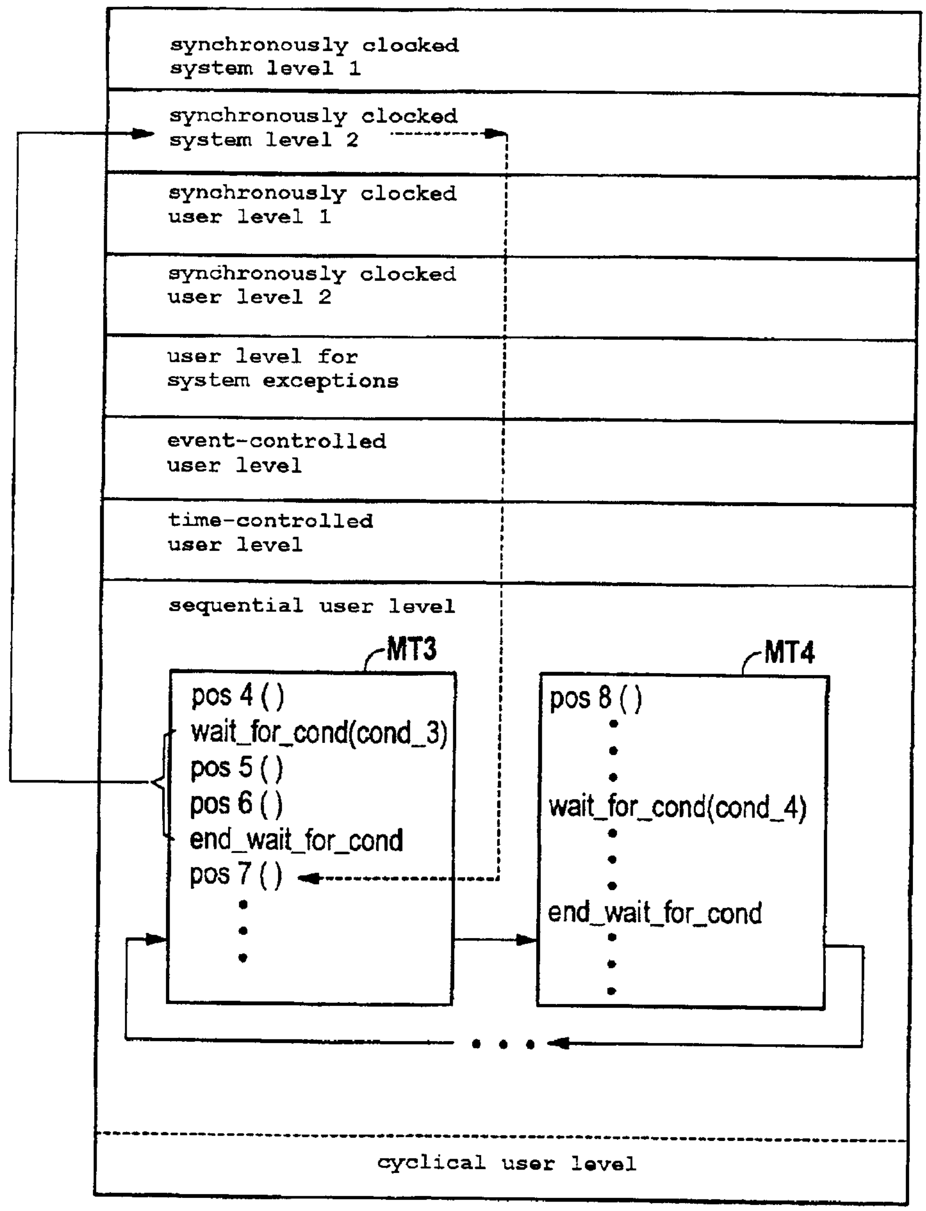
FIG. 7 shows a further exemplary embodiment of the use and mechanism of the wait_for_condition command in the running level model of the industrial controller according to the invention.

The representation according to FIG. 7 shows an extended exemplary embodiment of the use and mechanism of the wait_for_condition command, in the running level model of the industrial controller according to the invention. The wait_for_condition command (in FIG. 7 likewise represented as wait_for_condo( )) is used by way of example in this representation in the "sequential user level". The wait_for_condition command is used in the "motion tasks" MT3 and MT4 created by the user, which are a component part of the "sequential user level". The "motion tasks" MT3 and MT4 are in a round-robin cycle, represented by the arrow from MT3 to MT4 and by the looping return arrow from MT4 to MT3. The three bold dots in the return arrow indicate that there may be still further "motion tasks" in the round-robin cycle. The "motion task" MT3 contains the wait_for_condition command "wait_for_cond (cond_3)", the "motion task" MT4 contains the wait_for_condition command "wait_for_cond(cond_4)". The bold dots included in each case within MT3 and MT4 indicate that, in addition to the two wait_for_condition commands and the positioning commands pos4( ) to pos8( ), still further commands may be contained in the "motion tasks". The programming-language constructs "wait_for_condo" and "end wait_for_cond" have the effect of bracketing a program sequence in the "motion tasks". In the "motion task" MT3, the commands pos5( ) and pos6( ) are bracketed in this way. The use of "wait_for_condo" and "end_wait_for_cond" is also indicated in the "motion task" MT4. It is schematically indicated by 3 bold dots in each case in the "motion task" MT4 that further instructions may be present before, within and after the "wait_for_condo( )-end_wait_for_cond" construct.

The running level model, represented by way of example in FIG. 7, of a runtime system for an industrial controller comprises, as in FIG. 6, the following levels (enumeration from the lowest to the highest priority): "cyclical background level", "sequential user level" (the tasks of these two levels have the same priority, represented by the dashed line between these levels), "time-controlled user level", "event-controlled user level", "user level for system exceptions", "synchronously clocked user level 2", "synchronously clocked user level 1", "synchronously clocked system level 2" and, as the highest-priority level, a "synchronously clocked system level 1".

In FIG. 7, the operating mode of the wait_for_condition command with an associated program sequence is shown by way of example as wait_for_cond(cond_3)" from the "motion task" MT3. The checking of the condition cond_3 and the processing of the associated program sequence (bracketed between "wait_for_cond(cond_3)" and "end_wait_for_cond") take place in this case on a higher-priority level of the running level model. The program sequence belonging to "wait_for_cond(cond_3)" is formed by the sequence of the commands pos5( ) and pos6( ).

If the "motion task" MT3 is next in turn in the round-robin cycle, the commands of the "motion task" MT3 are serviced until the time slice has elapsed, or an interruption occurs. If this is the case, the "motion task" MT4 is serviced as the next task in the cycle, etc. If the "wait_for_cond(cond_3)" command is processed in the "motion task" MT3, the condition cond_3 is checked. If cond_3=true, that is to say is satisfied, the normal program sequence is continued, i.e., the command pos5( ) is executed next and, if appropriate, further commands present in MT3 are successively processed, until control is passed to the next motion task.

If the condition cond_3=false, that is to say is not satisfied, the "motion task" MT3 is immediately interrupted and MT4 is serviced in the round-robin cycle. The condition cond_3 and the commands pos5( ) and pos6( ) (as the associated program sequence) are processed in the priority of the "synchronously clocked system level 2" (indicated by the solid line arrow, starting from the bracket which expresses the unified nature of wait_for_cond(cond_3), end_wait_for_cond and the associated program sequence, up to the "synchronously clocked system level 2"). Condition cond_3 is checked in the clock cycle of this system level to ascertain whether it has been satisfied. If cond_3 has been satisfied, the associated program sequence (here: the sequence of the commands pos5( ) and pos6( )) is processed with the priority of the "synchronously clocked system level 2". The return from the "synchronously clocked system level 2" to the positioning command pos7( ), i.e., to the "sequential user level", is indicated by the dashed line arrow.

The fact that, when the condition of the wait_for_condition command has not been satisfied, the checking for the condition takes place in a high-priority "synchronously clocked system level" and, when the condition has been satisfied, an associated program sequence which can be created by the user is executed on this high-priority system level makes it possible for even extremely time-critical applications to be specified and carried out by simple language means.

One possible application is printed mark synchronization. The aim here is to detect a printed mark on a material with high priority. When this printed mark is detected, typically an actual value is captured ("latching" for example of a position or sensor actual value). On the basis of this captured actual value, a correction value is calculated and impressed on the system as a superposed movement. The process of actual value detection, correction value calculation and implementation of the superposed movement must take place in a deterministic time period. Therefore, this process must take place with high priority.

A further application is the "rapid start of movement". Here, the aim is to detect, for example, an edge change very quickly and then begin a start of movement (for example positioning movement) immediately thereafter. The deterministics of detecting an event and triggering consequent actions are decisive for the productivity of a machine. In the case of production machines, such cyclical processes must take place in a deterministic time, for example <100 ms or <50 ms. When processing the tasks on a normal background level, these deterministics cannot be guaranteed. The mechanism described is particularly suitable for use in the case of machines which have periodic machine cycles.

The performance is further enhanced by only inserting and considering currently applicable conditions when checking the conditions in the respective highpriority "synchronously clocked system levels".

As already mentioned in connection with FIG. 6, the mechanism described here does not require an explicit event handler. Consequently, the great advantage from the user viewpoint is that the user can now formulate high-priority events in a sequential running program on a relatively low priority level of a "motion task" in his program flow with the aid of program constructs, and does not have to change into another program which he then has to project by means of other mechanisms (for example manually or under interrupt control) onto a synchronous user task. Instead, the user has the possibility in a closed user program of formulating this "waiting for high-priority event" and "high-priority reaction" cycle for this event in a program on a closed basis.

The wait_for_condition command can be used by the user very flexibly and easily, since it is available as a normal programming-language construct. The formulation of the conditions is also flexible and easy for a user. For instance, for formulating these conditions, the user can use program variables from a user program or internal variables of the controller, or he can also reference process signals. These variables may then be combined logically, arithmetically or by any desired functions in terms of their content, to formulate a condition from them.

The wait_for_condition construct provides a user with the possibility in normal user programs for sequences of movements of temporarily switching a user program to a higher priority level, to be able to guarantee deterministic processes.

FIG. 8 shows the programming-language construct of the wait_for_condition mechanism as a syntax diagram. The terminal elements are in this case represented with rounded comers: "WAITFORCONDITION", "WITH", "DO", "END_WAITFORCONDITION" and ";". The non-terminal elements are represented as rectangles: "expression designation", "SWITCH" and "INSTRUCTION PART". The elements "WITH" and "SWITCH" are optional.

FIG. 9 shows the use of the wait_for_condition construct in a program sequence. In the upper part of FIG. 9, the formulation of the condition "my expression" is represented, in the lower part it is shown how this condition is used in a wait_for_condition construct.

FIG. 10 is a schematic representation of the possibilities for obtaining the basic clock for the industrial controller. FIG. 10 shows, by way of example, a communication topology into which the controller S is integrated. The controller S is represented by a square. The controller S is connected by a connection line A2 to the bus B1, to which the external device EG is attached via a connection line A1. The connection to the technical process P2 takes place via the bus B2. The technical process P2 is represented at the lower edge of the figure by a rectangle. The controller S is connected via the connection line A3 to the bus B2, which in turn establishes the connection to the technical process P2 via the connection line A4.

The generation for the basic clock of the controller S can take place from different clock sources. For example, from an internal clock source, represented by the internal timer T2 of the controller S or else by an external clock source, such as for example the timer T1, which belongs to the external device EG. The basic clock of a communication medium may also serve, however, as an external clock source. If the bus B2 is realized for example by an equidistant Profibus, the clock for the controller can be obtained from the basic clock of this bus. This is represented in FIG. 10 by the timer T3 being positioned directly on the connection line A3, and this connection line A3 establishes the connection to the bus B2. The controller S is consequently attached to the bus as a slave and can use the bus clock directly. Furthermore, a clock generator TG which is integrated in the technical process P2 may serve as an external clock source. A clock generator TG in a technical process may be, for example, the operating cycle of a production machine or packaging machine. In the representation according to FIG. 10, bus connections are represented by way of example as communication media. However, ring, star or other types of connection may also be chosen as communication media, as well as wireless connections. The basic clock mentioned above can then be derived from these connection systems.

We claim:

1. A method of operating a programmed industrial controller equipped with a runtime system comprising a plurality of priority levels for a production machine comprising the steps of executing a plurality of user tasks each comprising a program sequence for operating the production machine on a first priority level in a round robin fashion;

providing a check condition instruction for said tasks, wherein the occurrence of a check condition instruction in a first task initiates a checking for occurrence of a desired condition on a higher priority level wherein if the desired condition is not met, the execution of the current task is immediately stopped and execution is switched to the next task while said condition is concurrently checked, and a occurrence of said condition stops the execution of any of said next tasks and switches execution back to said first task.

2. The method according to claim 1, wherein once the condition has been satisfied, a following program sequence in said first task is processed with said higher priority up to an explicit end, the old task priority being resumed after the explicit end of the program sequence.

3. The method according to claim 2, wherein the explicit end is an end condition instruction.

4. The method according to claim 2, wherein the explicit end is an instruction indicating the end of said first task.

5. The method according to claim 1, wherein process signals and/or internal signals of the controller and/or variables from user programs are used for the formulation of the conditions.

6. The method according to claim 1, wherein the conditions contain logical and/or arithmetic and/or any desired functional combinational operations.

7. The method according to claim 1, wherein the user program for the operation of the controller is capable of responding in the manner set forth more than one such condition.

8. The method according to claim 1, wherein there are provided for the controller, a plurality of user programs which operate in the manner set forth.

9. The method as claimed according to claim 1, wherein the program for operating the controller is available as a customary programming-language construct.

10. An industrial controller for carrying out the method according to claim 1, wherein the runtime system of the controller contains a running level model which has a plurality of running levels of different types with different priority, said running levels comprising:

a) a group of levels with synchronously clocked levels, having at least one system level and at least one user level, the levels of this group of levels being capable of being prioritized with respect to one another;

b) a user level for system exceptions;

c) a time-controlled user level;

d) an event-controlled user level;

e) a sequential user level; and f) a cyclical user level; and wherein user levels of the group of levels a) are able to run synchronously in relation to one of the system levels of the group of levels a).

11. The industrial controller according to claim 10, wherein the basic clock of the running level model is derived from any one of an internal timer, an internal clock of a communication medium, an external device or a variable which belongs to the technological process of the machine.

12. The industrial controller according to claim 10, wherein the time-controlled user level, the event-controlled user level, the sequential running level, the cyclical background level and the user level for system exceptions are optional.

13. The industrial controller according to claim 10, wherein the synchronous levels are clocked in relation to the basic clock with a step-up and/or step-down ratio and/or in the ratio 1:1.

14. The industrial controller according to claim 10, wherein further prioritizing stratifications are provided within the running levels.

15. The industrial controller according to claim 10, wherein user tasks can optionally be run through during system running-up and/or during system running-down.

16. The industrial controller according to claim 10, wherein user programs which, depending on the type of user level, are programmed in a cycle-oriented or sequential manner can be loaded into the user levels.

* * * * *